US009123213B2

(12) United States Patent
Tunioli et al.

(10) Patent No.: US 9,123,213 B2
(45) Date of Patent: Sep. 1, 2015

(54) PORTABLE TERMINAL FOR ACQUIRING PRODUCT DATA

(75) Inventors: Roberto Tunioli, Bologna (IT); Stefano Amorosi, Sasso Marconi (IT); Marco Bottazzi, Ferrara (IT)

(73) Assignee: DATALOGIC MOBILE S.R.L., Lippo di Calderara di Reno (BO) (IT)

( * ) Notice: Subject to any disclaimer, the term of this patent is extended or adjusted under 35 U.S.C. 154(b) by 626 days.

(21) Appl. No.: 12/997,949

(22) PCT Filed: Jun. 19, 2008

(86) PCT No.: PCT/IT2008/000412
§ 371 (c)(1),
(2), (4) Date: Dec. 14, 2010

(87) PCT Pub. No.: WO2009/153819
PCT Pub. Date: Dec. 23, 2009

(65) Prior Publication Data
US 2011/0096764 A1    Apr. 28, 2011

(51) Int. Cl.
G06C 11/00    (2006.01)
G06K 15/00    (2006.01)
G07G 1/00    (2006.01)
G06Q 20/32    (2012.01)

(52) U.S. Cl.
CPC .............. *G07G 1/0045* (2013.01); *G06Q 20/32* (2013.01); *G06Q 20/322* (2013.01); *G07G 1/0081* (2013.01); *Y04S 50/12* (2013.01)

(58) Field of Classification Search
CPC ....... G06Q 20/32; G06Q 20/322; Y04S 50/12
USPC ............... 370/252, 338; 705/23, 70; 235/383, 235/462.15
See application file for complete search history.

(56) References Cited

U.S. PATENT DOCUMENTS

| 6,377,860 B1 * | 4/2002 | Gray et al. ...................... 700/83 |
| 6,430,164 B1 * | 8/2002 | Jones et al. .................... 370/313 |
| 6,559,773 B1 * | 5/2003 | Berry ........................ 340/815.4 |
| 7,146,260 B2 * | 12/2006 | Preston et al. .................. 701/24 |

(Continued)

FOREIGN PATENT DOCUMENTS

| EP | 0856812 A | 8/1998 |
| EP | 1583050 A | 10/2005 |

OTHER PUBLICATIONS

Pradhan S., et al., "Bluetooth as an Enabling Technology in Mobile Transactions," Information Technology: Coding and Computing, 2005, IEEE, vol. 2, Apr. 4, 2005, pp. 53-58.

(Continued)

*Primary Examiner* — Steven H Nguyen
(74) *Attorney, Agent, or Firm* — Duane Morris LLP (57) ABSTRACT

A portable terminal for the acquisition of product data, for example in a point of sale or in a collection, distribution and/or storage point, includes a coded information reader, a user interface, and an interface for the logical connection with an external control station. Advantageously, the terminal also includes an interface for the wireless connection with cellular devices and/or telephones and/or PDAs and at least one internal management unit for the activation of the interface. The interface allows establishing a wireless connection with a single pre-identified cellular device and/or telephone and/or PDA, i.e., recognized following a recognition procedure. The terminal is then configured as a peripheral device of the pre-identified cellular device.

17 Claims, 3 Drawing Sheets

(56) References Cited

U.S. PATENT DOCUMENTS

| | | | |
|---|---|---|---|
| 7,904,219 B1* | 3/2011 | Lowrey et al. | 701/32.3 |
| 2002/0059147 A1* | 5/2002 | Ogasawara | 705/70 |
| 2002/0065728 A1* | 5/2002 | Ogasawara | 705/23 |
| 2002/0170961 A1 | 11/2002 | Dickson et al. | |
| 2002/0196134 A1* | 12/2002 | Lutter et al. | 340/426 |
| 2003/0001017 A1* | 1/2003 | Konda | 235/462.15 |
| 2003/0120555 A1* | 6/2003 | Kitagawa | 705/26 |
| 2005/0164633 A1* | 7/2005 | Linjama et al. | 455/41.2 |
| 2006/0007920 A1* | 1/2006 | Michel et al. | 370/352 |
| 2006/0073788 A1* | 4/2006 | Halkka et al. | 455/41.2 |
| 2006/0160567 A1 | 7/2006 | Parivash | |
| 2006/0215601 A1* | 9/2006 | Vleugels et al. | 370/328 |
| 2007/0140187 A1* | 6/2007 | Rokusek et al. | 370/338 |
| 2007/0225047 A1* | 9/2007 | Bakos | 455/566 |
| 2007/0296559 A1* | 12/2007 | Fehr | 340/426.2 |
| 2008/0081663 A1* | 4/2008 | Kasslin et al. | 455/557 |
| 2008/0240048 A1* | 10/2008 | Okker et al. | 370/338 |
| 2008/0279130 A1* | 11/2008 | Lewis | 370/311 |
| 2008/0311957 A1* | 12/2008 | Jantunen et al. | 455/560 |
| 2009/0234728 A1* | 9/2009 | Willuns et al. | 705/14 |
| 2009/0248913 A1* | 10/2009 | Salokannel | 710/33 |
| 2009/0282124 A1* | 11/2009 | Rauhala et al. | 709/216 |
| 2010/0303236 A1* | 12/2010 | Laaksonen et al. | 380/270 |

OTHER PUBLICATIONS

International Search Report and Written Opinion of the ISA dated Feb. 13, 2009 in corresponding International Application No. PCT/IT2008/000412.

EPO Preliminary Opinion issued Dec. 4, 2013 in counterpart EP patent application.

* cited by examiner

PORTABLE TERMINAL FOR ACQUIRING PRODUCT DATA

FIELD OF THE INVENTION

The present invention refers to a portable terminal for acquiring product data, for example at a point of sale, in a warehouse, at a collection centre, sorting centre or delivery/distribution point, etc.

BACKGROUND AND SUMMARY OF THE INVENTION

In general, the portable terminals for the acquisition of product data comprise a coded information reader, for example a bar code reader, a power supply system, for example a battery, an internal management unit of the terminal, provided with a memory and a software, and an interface for the logical connection with an external control station, for example a console or a remote station. In addition, the terminals normally also comprise a user interface, for example an alphanumeric keyboard or a touch-screen. The logical connection with the related external control station allows to link the terminal with a computer system, for example the management system of the warehouse products.

In the following present description and in the subsequent claims, with the expression "coded information reader", it is meant any device capable of acquiring information related to one object (for example, distance, volume, bulk, or its identification data) by means for example of the acquisition and processing of a light signal diffused by the same object. With the term: "coded information" in such case it is intended to indicate the set of identification data contained in an optical code.

With the term: "optical code", it is intended any graphical representation having the function of storing coded information. A particular example of optical code consists of linear or two-dimensional codes wherein the information is coded by means of appropriate combinations of elements of predetermined shape, for example squares, rectangles or hexagons, of dark colour (normally black) separated by light elements (spaces, normally white), such as the barcodes, stacked codes and two-dimensional codes in general, colour codes, etc. More generally, the term "optical code" also comprises other graphical forms having information coding function, including printed characters (letters, numbers, etc.) and particular patterns (such as stamps, logos, signatures, fingerprints etc.). The term "optical code" also comprises detectable graphical representations, not only in the visible light field, but also in the wavelength range comprised between infrared and ultraviolet.

With "coded information" it is also desired to indicate any piece of information, or set of information, coded and stored in a transponder or RFID "tag" which can be read and/or written in a known manner by means of a reading and/or writing radiofrequency device (better known as RFID reader). Generally, the readers of optical codes comprise at least one electronic circuit, one light source, for example formed by a group of LED diodes and possibly lighting optics, adapted to illuminate an optical code, for example a barcode, and reception optics and a linear or matrix light sensor, of the charge coupling type (CCD) or of the Complementary Metal-Oxide Semiconductor (C-MOS) type, cooperating with the electronic circuit and adapted to receive the light diffused by the barcode. The light sensor is adapted to receive the light diffused by subsequent adjacent portions of the code, upon focusing by the reception optics, while the reader is positioned facing the code itself, in contact or at a distance; in this manner, the light sensor is adapted to generate a signal modulated by the succession of the differently coloured elements (light and dark bars in case of barcode reading) of the code. Such alternated signal is processed by the electronics circuit for the extraction of the alphanumeric information associated with the optical code.

There are also readers of "back-reflective" type, in which the reading of the optical code occurs via lighting in succession of the various zones of the optical code by means of a collimated light beam, typically a laser, generated by a laser diode with suitable optics, and by means of the detection by a photodiode of the light diffused from the zone of the optical code lightened each time.

If the coded information is stored in a RFID tag, the reader generates an electromagnetic field at an excitation frequency for the tag that, once it has entered such field, transmits towards the reader a signal containing the code stored in the tag itself. An analogous method is used for writing information in the tag.

The coded information can also be the combination of one or more optical codes and a RFID tag. Readers are in fact known provided with optical and electronic members for reading both information types.

The portable terminals are used in different sectors of commerce and industry for acquiring data related to products that have to be treated. For example, is known the use of portable terminals for the reading of coded information in optical codes or RFID tags provided on the packaging of the products, or on the products themselves, in warehouses or collection points, post offices, points of sale or sorting centres, etc. The terminals are used by the operator in charge for receiving and sorting of products, or by the inventory, warehouse or delivery worker, etc., or they are directly used by the final user in warehouses or shopping centres of mid- to large-size in order to achieve a self-service shopping system, and in particular a self-scanning system.

In the following present description and subsequent claims, with the expression "self-service shopping system", it is intended to indicate a shopping system in which the customer directly takes the products from the various shelves of the shopping centre which he intends to purchase and places them in a cart or basket, and then makes his way to the checkout counter where an operator of the shopping mall scans such products one by one before the window of an optical reader so to read its optical code, in the end calculating the overall amount to be paid.

With the expression "self-scanning shopping system", it is instead intended to indicate a self-service shopping system in which the reading of the optical code is not carried out by the operator of the shopping centre at the checkout counter, but by the same customer, by means of a suitable portable terminal previously taken from a suitable terminal distribution device provided for in the shopping centre. The customer, in such shopping system, reads the optical code of the products to be acquired as they are drawn from the shelves of the shopping centre and before putting them in the cart or basket; at the end of the shopping operations, the customer puts the terminal back into the device where he had taken it, takes a receipt from the same bearing the overall amount to be paid and heads to the checkout counter to pay, after having shown the receipt. Alternatively, the customer heads directly to the checkout counter of the shopping centre with the terminal; this is then delivered to a shopping centre operator who, by means of reading a particular end-shopping code activates the data transfer related to the shopping, so to calculate in the end the overall amount to be paid.

As is known, the self-scanning shopping systems allow to considerably increase the speed of the operations conducted by the checkout counter operators in shopping centres, removing therefrom the task of carrying out the reading operations of the optical codes on every single product; such operations, in fact, often lead to the formation of long queues at the checkout counters, especially at particularly peak hours, like closing time.

Even if in the present description reference will be explicitly made to the application for self-scanning shopping, the portable terminal according to the present invention is also applicable in different sectors, such as, for example, the logistics sector (transportation, distribution and goods storing), the postal sector (collection and sorting of the mail and postal parcels), the quality control sector (verification of the data related to the products in assembly line or production), etc.

The Applicant has observed that the user of the terminal typically also has a cellular device (GSM, UMTS or other). Such device is used today for carrying out operations that are also very different from voice communication, such as for example payment operations and personal identification operations.

It often happens that the user has the need to simultaneously use the cellular device and the terminal.

It is known that the terminals can be provided with GSM and/or UMTS functionalities. In this case, the terminals must be provided with one slot in which a SIM telephone card is inserted. The insertion of a SIM card in the terminal allows the connection to the cellular network of a mobile operator for sending and receiving of calls and data. The use of this function by the final user is often difficult, since it is necessary to arrange a dedicated SIM card at the terminal, or it is necessary to take the SIM card from a different cellular device of the user and insert it in the terminal.

The applicant has deemed it opportune to modify the current terminals in order to facilitate their connection with external devices, so to avoid the need to arrange a dedicated SIM card or use the SIM card of other devices.

The present invention therefore refers, in a first aspect thereof, to a portable terminal for acquiring product data, comprising:
 a coded information reader;
 a user interface;
 an interface for the local connection with an external control station;
 an interface for the wireless connection with cellular devices and/or telephones and/or PDAs;
characterized in that it also comprises at least one internal management unit for activating said interface for the wireless connection with a single pre-identified cellular device and/or telephone and/or PDA, configuring the terminal as a peripheral device of said cellular device and/or telephone and/or PDA.

Advantageously, the interface permits establishing a wireless and bidirectional connection with a cellular device and/or telephone and/or PDA, so to be able to carry out, by means of the terminal, the operations that can generally be carried out by means of the aforesaid device.

In the following present description, for the sake of clarity and for simplifying the reading, reference will often be made to cellular devices. It is however intended that what is said for the cellular devices will have analogous application to portable devices with telephone function of different type, such as for example portable telephone devices of another kind, using for example VOIP over WiFi, mixed technology devices (i.e. with GSM or UMTS and with WiFi) or PDAs (such as BlackBerry® or PDAs).

Preferably, the interface for the wireless connection is an interface for the bidirectional wireless connection based on a short-range, exclusive wireless communication protocol, for example a Bluetooth® protocol commonly used for the connectivity between modern cell phones. A protocol of the abovementioned type has the advantage of permitting the connection between the terminal and a single cellular device. In other words, once a connection between the terminal and the cellular device of a user has been established, such protocol does not allow establishing other connections with other cellular devices.

The internal management unit is therefore preferably programmed for activating the connection with a single cellular device, usually when such device was positively identified by means of the aforesaid communication protocol.

Preferably, the user interface of the terminal comprises at least one element selected from among a speaker, a display, a physical or logical keyboard (for example a virtual keyboard on a touch-screen), and a microphone or voice input system. More preferably, the user interface comprises all of the above-listed elements.

The coded information reader is preferably an optical code reader, for example a barcode reader.

Preferably, the interface for the logical connection with an external control station is an interface for the bidirectional wireless connection of WLAN type. The external control station can be a computer.

In a second aspect thereof, the invention regards a method for operating the terminal, according to claim 6.

In particular, the present invention concerns a method for operating a terminal according to any one of the preceding claims as a peripheral device of said cellular device and/or telephone and/or PDA, characterised in that it comprises the steps of:
 activating said interface for the wireless connection with cellular devices and/or telephones and/or PDAs;
 establishing a wireless connection with a pre-identified cellular device and/or telephone and/or PDA.

Preferably, the interface for the wireless connection with cellular devices and/or telephones and/or PDAs is an interface for the bidirectional wireless connection based on a short-range, exclusive wireless communication protocol, such as for example the Bluetooth® protocol. The identification of the cellular device can for example occur by carrying out, through the terminal, a scanning of the active cellular devices (i.e. visible at the Bluetooth® interface) in an area adjoining the terminal, or alternatively by carrying out, through one's own cellular device, a scanning of the active terminals (i.e. visible at the Bluetooth® interface) in an area adjoining the cellular device, and establishing a bidirectional one-to-one connection between terminal and cellular device.

Once connected to the previously identified cellular device, the terminal is configured as a peripheral device of such device.

For example, the user interface of the terminal can be activated for receiving and/or sending at least one telephone call, a data file, a voice message, an audio signal, a digital image or a message in text/image format, using the wireless connection with the corresponding cellular device, telephone and/or PDAs. In other words, the terminal can be configured as a peripheral device of the cell phone or PDA of the user and can replicate several of its functions or implement new ones.

Preferably, the short-range, exclusive wireless communication protocol underlying the functioning of the wireless interface of the terminal can be configured according to a plurality of functional profiles, which can be selected independently from each other, or in combination.

As an example, one functional profile is the "Headset" profile, so that the terminal is comparable to the earphone of a cell phone, and at which a speaker and a microphone of the user interface of the terminal (or an earphone connected thereto) are activated in order to permit the user to carry out telephone conversations and/or exchange voice messages or audio signals in general with the cellular device. When the Headset profile is activated, the user can use the terminal as if it was his/her own cell phone. The terminal, for example, receives calls and/or voice and/or voice messages and sounds by means of the Bluetooth® connection with the cell phone, which can be left, for example, in a pocket of the user's clothes. The Headset can be configured in combination with the "speaker" operating mode, at which the user interface of the terminal permits carrying out telephone conversations with the terminal that is far from the ear and mouth of the user.

A second functional profile can be the "Hands Free" profile, at which a physical or logical keyboard of the user interface of the terminal is activated in order to permit the typing of numbers and/or letters. If the cell phone supports voice recognition, it is possible with the Hands Free profile to also control it by means of voice commands sent through the microphone or voice input system of the terminal. In this way, the user can make and/or receive a call with the terminal, instead of using the keyboard of his own cell telephone or PDA, from which the term Hands Free arises, referred to the cell phone. The Hands Free profile can also be configured in association with the speaker operating mode.

In addition, there are profiles suitable (in particular OBEX) for the transmission of text messages (SMS), images and/or data in general, by means of the Bluetooth® connection with the cell phone.

In general, the user interface of the terminal can be activated in order to show and/or transfer the contents of or information on data/images files stored in the cellular device and/or telephone and/or PDA of the user.

Preferably, the user interface of the terminal can be activated in order to modify the aforesaid data/image files. This feature permits, for example, reading and modifying a shopping list stored in the cell phone of the user before he/she goes shopping or to write in the cell phone the total or partial list of the shopping completed during the self-scanning of products in a supermarket.

Preferably, the interface for the logical connection with an external control station can be activated in order to transfer data and/or images acquired by the terminal to the station.

The wireless connection between the terminal and the pre-identified cell device is preferably of bidirectional type. Therefore, in a preferred embodiment of the present invention, such connection can be activated in order to transfer data and/or images acquired by the terminal to a memory of the cellular device.

For example, it is possible that advertising messages and/or the list of products acquired by the customer of a supermarket at the end of the shopping or specific information on several products are sent to the control station outside the cellular device, through the wireless connection between the cellular device and the terminal.

According to a preferential aspect of the present invention, the user interface of the terminal can be activated in order to carry out a recognition/identification procedure of a single cellular device and/or telephone and/or PDA of a user. The coded information reader is activated only when the recognition/identification process is successfully completed. This characteristic permits associating the data acquired by the terminal with a single cellular device, i.e. permits associating the data with a single user and cellular device owner.

The coded information reader and/or user interface of the terminal can be activated by means of a command sent by the cellular device. For example, once the Bluetooth® connection is established between the cellular device and the terminal, the user can use the cellular device for sending an activation signal of the optical reader and/or user interface.

In particularly preferred embodiments of the present invention, the user interface and/or interface for the logical connection with an external control station can be activated and configured for carrying out payments. This feature is particularly advantageous when the terminal is used for collecting data from products sold in a shopping centre, in a supermarket, etc.

Preferably, the connections of the terminal, i.e. the user interface, the interface for the wireless connection with the cellular device and/or interface for the logical connection with an external control station, are deactivated at the end of the coded information reading, for example, in the case of self-scanning applications, at the end of the shopping.

The terminal according to the present invention thus permits carrying out the recognition of a single user by means of an identification process of a cellular device and/or telephone and/or PDA thereof.

BRIEF DESCRIPTION OF THE DRAWINGS

Once the cellular device has been identified, it is possible to establish an exclusive bidirectional wireless connection between the terminal and the device. The terminal can then be configured as a peripheral device of the device pre-identified by the user.

Further characteristics and advantages of the present invention will be clearer from the following detailed description of several preferred embodiments thereof, made with reference to the attached drawings. In such drawings.

DETAILED DESCRIPTION

Figure 1:
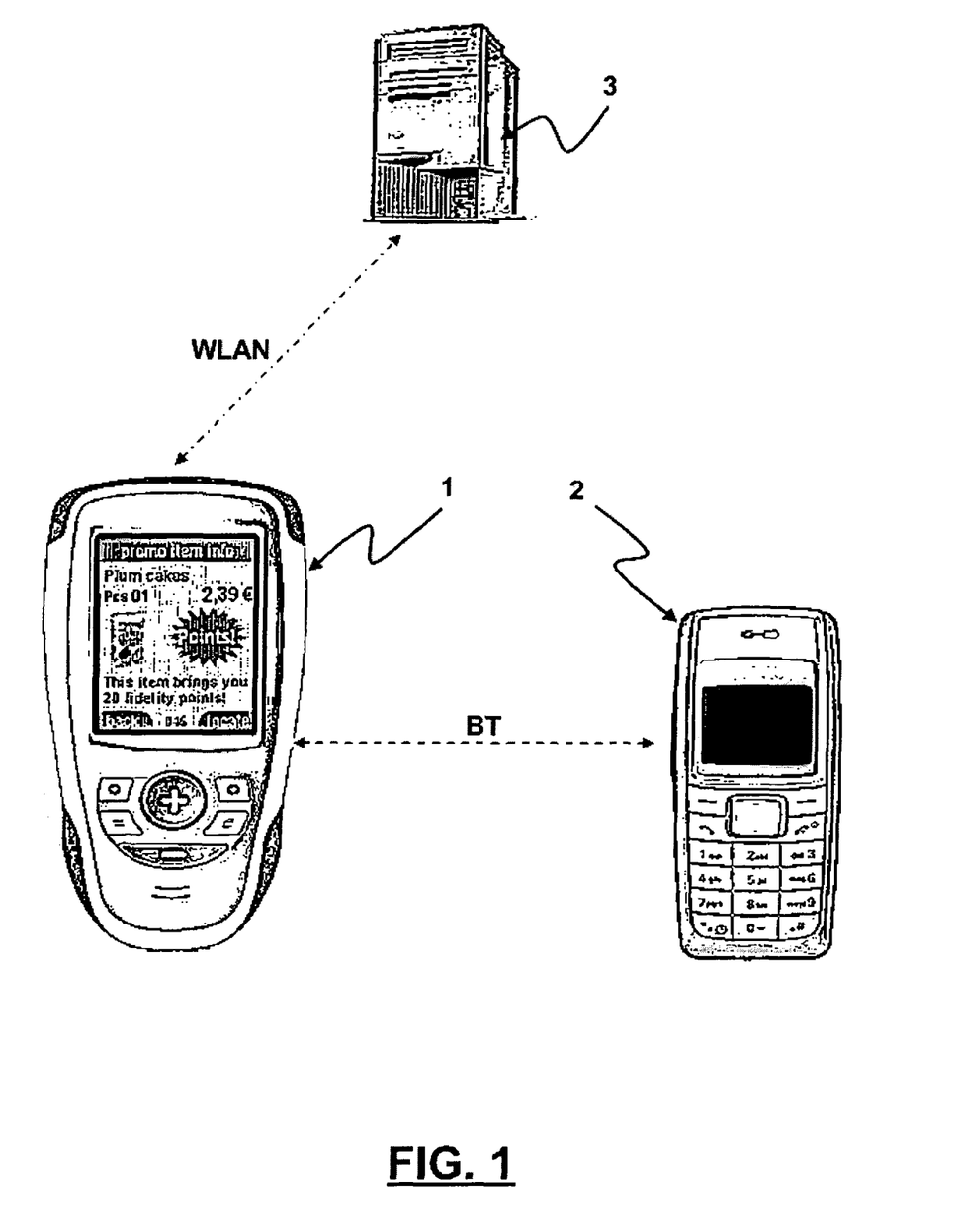
FIG. 1 is a schematic view of a wireless communications network comprising a terminal according to the present invention.
Figure 2:
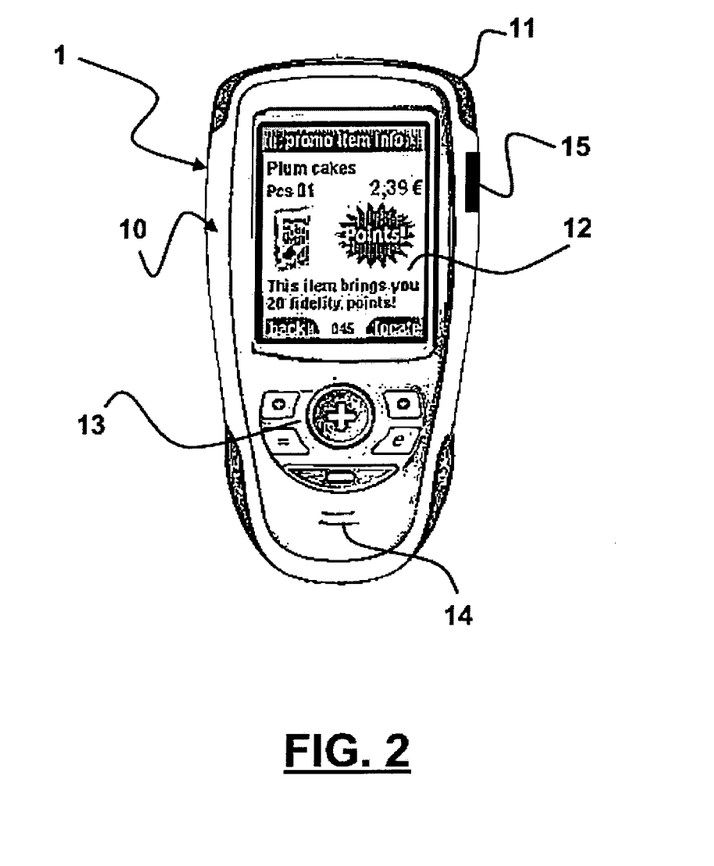
FIG. 2 is a front view of the terminal shown in FIG. 1.
Figure 3:
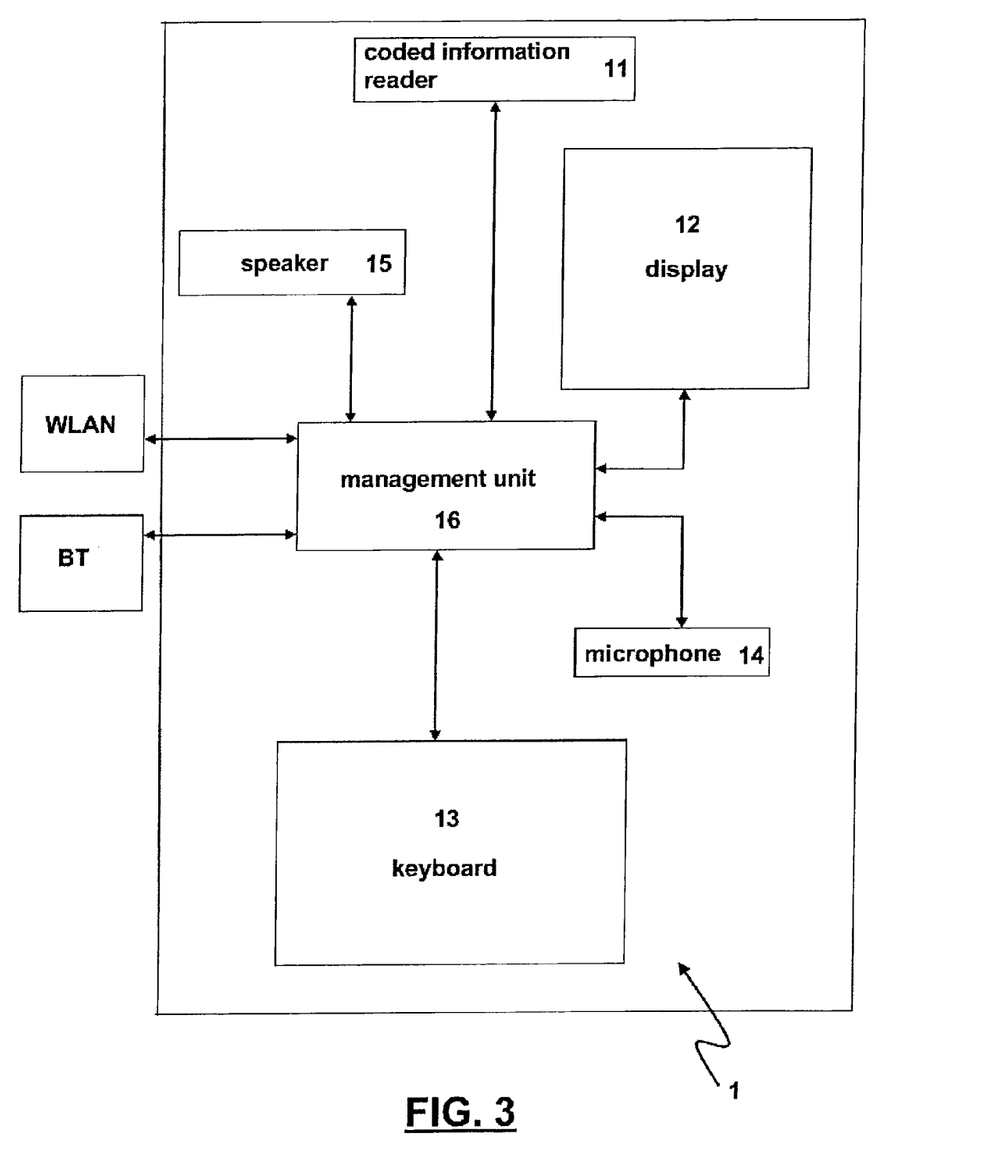
FIG. 3 is a block diagram related to the functioning of the terminal shown in FIG. 1.

In such figures, with 1, a portable terminal is indicated for the acquisition of product data (not shown). In general, the terminal 1 can be used in a point of sale, in a warehouse, in a collection, sorting or delivery/distribution point of products, i.e. in fields in which the collection of data is provided, related to products to be sold, or sorted or stored, catalogued etc.

The terminal 1 shown in FIGS. 1 and 2 is preferably intended to be used in mid-to-large-size commercial stores in order to make a self-scanning shopping system.

The terminal 1 comprises a housing 10 that can be gripped by a user. In the housing, a coded information reader 11 is contained, as well as a user interface, and an interface for the logical connection with an external control station 3. Advantageously, the terminal also comprises an interface for the wireless connection with cellular devices 2, telephones and/or PDAs. The connections described above are schematised with dashed lines in FIG. 1.

The external control station 3 can be a computer. In the self-scanning applications, the external control unit 3 oversees the functioning of the entire self-scanning system, coordinating a multiplicity of terminals 1. It can be made inside a distributor of terminals 1 or it can be at a distance from such distributor, particularly if in the supermarket there are several distributors of terminals 1.

According to a preferred embodiment of the invention, the interface for the logical connection with an external control station 3 is an interface of WLAN type (for example, an interface of WiFi type).

In terminal 1 shown in FIGS. 1 and 2, the user interface comprises a speaker 15, a display 12, a physical or logical keyboard 13 (for example, a virtual keyboard on a touch-screen), and a microphone 14.

Preferably, as schematised in FIG. 3, where a block diagram is shown of the logic structure of terminal 1, a unit 16 inside terminal 1 provides the management of the coded information reader 11, of the user interface, and of the interface for the logical connection with an external control station 3. The internal management unit 16 is preferably an electronic circuit board provided with memory in which software and the drivers for the control of the reader 11 and the interfaces are loaded.

The cellular device 2 is also provided with wireless interface for the connection with external devices. For example, the device 2 is a cell phone or a PDAs of GSM or UMTS type.

The cellular device is also provided with a second interface for the bidirectional, short-range exclusive wireless connection. In the preferred embodiment of the present invention, such interface is based on the Bluetooth® communication protocol and is schematised with the reference BT in FIG. 3. Nevertheless, the use of different communication protocols cannot be excluded, having at least the functionalities of the Bluetooth® protocol described in the present application.

In other words, the terminal 1 and the cellular device 2 are both provided with a wireless connection interface based on the Bluetooth® protocol. Such protocol, widely used in modern cellular devices and in computers, permits establishing with considerable ease a logical connection between the terminal 1 and a single cellular device 2 localised near terminal 1. Once a first connection has been established, the Bluetooth® protocol does not allow a second connection with a second cellular device 2 in parallel with respect to the first connection, i.e. when the first connection is active. In other words, the interface BT of the terminal 1 permits establishing one single wireless connection at a time with a cellular device 2.

The coded information reader 11 is preferably an optical code reader, for example a reader of optical codes printed on the labels of products. For example, such reader is a barcode reader. Alternatively, or additionally, the coded information reader 11 is a RFID tag reader.

Preferably, the functioning of the terminal 1 provides that if the user desires to logically connect the terminal 1 and its cellular device 2, the coded information reader 11 is activated by the management unit 16 only when the wireless connection with a single pre-identified cellular device 2 is successfully established. In this manner, the data acquired by the terminal 1 is associated in a one-to-one manner with a single cellular device 2, and thus to a single user.

The identification of the cellular device 2 can be obtained in different ways. Preferably, the management unit 16 is programmed for activating the wireless interface BT of the terminal 1 and for carrying out, by means of this interface, a scanning of the active cellular devices 2 with the operating range of the interface BT itself. The list of active devices 2 is displayed on the 12 and through the keyboard 13, the user can select a single device 2 to which the terminal must be connected.

Since there can be a large number of active devices 2, the management unit 16 can be programmed to carry out the scanning for finding a predefined device, i.e. a device 2 whose identification code is previously known. In the self-scanning applications, for example, the customers may be asked to register in the service itself. At the time of registration, each customer provides his/her personal data (first name, last name, fidelity card number, etc.) and the identification code of his/her own cellular device 2 (telephone number, nickname or alphanumeric code). Such code is stored in the external control unit 3 which oversees the functioning of the self-scanning system itself or in any other computer system connected or connectable thereto. When the customer requests to use a terminal 1 for shopping in self-scanning mode, the control unit 3 identifies the customer and assigns him/her a terminal 1, signalling to him/her, for example, the terminal 1 to pick up from the terminal distributor, and transferring on the same terminal 1, through the WLAN connection, the identification code of the customer cellular device. Alternatively, the transfer of the identification code can be made by means of a serial interface or USB present in the housing of the terminal distributor. In the latter case, the control unit 3 has previously transmitted, through the WLAN wireless network or wired network, the identification code of the customer cellular device to the terminal distributor. Once it has received this identification code, the management unit 16 carries out a scanning so to find the single device 2 whose identification code was previously communicated to the control unit. In this manner, the identification step of the devices 2 of all customers is simplified.

Alternatively, in the self-scanning applications, when a customer picks up a terminal 1, the external control unit 3 can control the management unit 16 of the terminal 1, through the connection WLAN or through a serial interface or USB of the terminal distributor, to utilise a nickname or identification code previously established by the customer as its own identification for the connection BT. The customer, with his/her own cellular device 2, can carry out a scanning of the active terminals 1 in the surrounding area, and can, still through his/her device 2, establish the connection BT with the terminal 1 corresponding with the nickname or with the selected identification code.

Alternatively, in a self-scanning application, the procedure can provide that the customers directly identify themselves at the external control unit 3. The control unit assigns a specific terminal 1 to each customer. The customer picks up the terminal 1 assigned to him; utilising the connection WLAN, the control unit 3 commands the selected terminal 1 to send a data message (for example of OBEX type) to the customer device 2 (whose number is known by way of the service registration) via BT, such data message containing identification information of terminal 1 itself. The reception of the message permits the cellular device 2 to automatically create the wireless connection BT with the selected terminal 1 and to activate the selected profile, as described below.

Alternatively, at the time of customer registration in the self-scanning service, a unique Bluetooth® identification is stored on the customer cellular device 2. When the terminal 1 is picked up, a Bluetooth® identification is set on the same terminal 1 corresponding with the identification stored on the customer cellular device 2. In this manner, the customer activates the connection BT with the terminal 1 directly from his/her own cellular device 2 by selecting the identification corresponding to the selected terminal 1.

Once connected to the identified cellular device 2, the terminal 1 is configured as a peripheral device of such cellular device.

For example, the user interface of the terminal 1 can be activated for receiving and/or sending at least one telephone call, voice messages, audio signals in general, data files, a digital image or a message in text/image format by using the connection BT with the cellular device 2 of the customer. In this configuration, the terminal 1 functions as "an extension" of the cellular device 2, i.e. it replicates its main functions. Advantageously, the customer can keep his/her own cellular device 2 in his/her pocket, and use the terminal 1 in its place for making/receiving calls or sending/receiving messages and/or files.

Preferably, the terminal 1 can be configured according to a plurality of functional profiles, which can be selected independently from each other or in combination, in order to maximise the flexibility of the terminal 1.

A first functional profile is the "Headset" profile, for which the terminal 1 can be comparable to an earphone of the cellular device 2 and at which the speaker 15 and the microphone 14 of the terminal 1 (or an earphone connected thereto) are activated in order to conduct telephone conversations and/or exchange voice or audio signals in general with the cellular device 2. In practice, when the Headset profile is activated, the user can use the terminal 1 as if it was his/her own cell phone 2. The terminal 1, for example, can thus receive calls and/or voice messages and sounds by means of the Bluetooth® connection with the cell phone 2.

A second functional profile is the "Hands free" profile, at which the keyboard 13 is activated in order to permit the typing of numbers and/or letters. In this manner, the user can type a telephone number and use the user interface of the terminal 1 and the connection BT with his/her own cellular device 2 in order to make phone calls. If the cellular device 2 supports the voice recognition, it is possible the Hands Free profile also controls it by means of vocal commands sent through the microphone 14 of the terminal 1.

With both profiles, the "speaker" operating mode can be activated, at which the speaker 15 and the microphone 14 are activated so to permit the user to conduct telephone conversations with the terminal 1 positioned at a distance from the ear and mouth. This operating mode is useful in the self-scanning operations or in inventory or receiving operations and product distribution, when the user cannot grip the terminal 1, but is obliged to position it on a support.

On the display 12 of the terminal 1, the content can be displayed of the data and/or image files stored or received in the cellular device 2. Since the terminal 1 can be configured as a peripheral device of the device 2 to which it is connected, possible data and/or image files can be transferred by the device 2 to the terminal 1 and vice versa. The keyboard 13 can be used for modifying the contents of such files.

The exchange of the aforesaid files can also occur between the terminal 1 and the external control station 3 through the WLAN connection. In this manner, it is possible to display, on the display 12, information sent to the control unit 3, or to send the data collected by means of the coded information reader 11 from the terminal 1 to the unit 3.

For example, in the goods sorting and delivery applications, the operator can carry out the deliveries by using a vehicle provided with a GSM communication system; the operator can leave the vehicle and carry out the collection of data with the terminal 1 while simultaneously responding to possible telephone calls coming into the GSM operating station present on the vehicle. In addition, as an example, a data file containing the information on the deliveries carried out can be directly modified on the terminal 1 by means of the keyboard 13 and sent to a remote centre by means of the vehicle's GSM station.

Advantageously, in all of the abovementioned applications, it is not necessary to extract the SIM card from the cellular device 2 in order to insert it in the terminal 1. It is sufficient to establish the connection BT between these elements.

Preferably, it is possible to make payments with the terminal 1. This function is particularly advantageous in the self-scanning applications of products in points of sale, shopping centres and supermarkets. The user interface and/or interface WLAN can be activated and configured in order to make payments with credit cards, with fidelity cards, etc.

For example, in the self-scanning applications, the user goes to the checkout counter in order to pay for the products scanned with the terminal 1. After the checkout counter has determined the amount to be paid, the customer receives the amount information on the display 12 of the terminal 1, as well as a list of the selectable payment methods. If the customer desires to make the payment with his own cellular device, for example using his/her own SIM card, the customer presses the proper button on the keyboard 13 (or a logic key on the display 12 if such display is of touch-screen type) of the terminal 1. In this circumstance, the terminal 1 obtains the customer identification information necessary for the payment from the cellular device 2, through the connection BT. The terminal 1 can, in this step, ask the customer to type a numeric safety PIN code through the keyboard 13. The terminal 1 validates the PIN and communicates to the control unit 3 the authorisation for completing the payment transaction.

The connection BT and/or the connection WLAN are preferably deactivated at the end of the data/image acquisition with the terminal 1, for example after finishing the shopping activity, in the self-scanning applications.

The advantages offered by the terminal 1 according to the present invention are evident. The terminal 1 permits carrying out the recognition of a single user by means of an identification procedure of a cellular device 2, telephone and/or PDA thereof. Once the cellular device 2 has been identified, the terminal 1 is configured as a peripheral device of such device 2 for all those functions typical of modern cellular devices, permitting the bidirectional exchange of data and voice calls.

What is claimed is:

1. A portable terminal for acquiring product data, comprising:
   a coded information reader;
   a user interface;
   an interface for the logical connection with an external control station;
   an interface for the wireless connection with cellular devices and/or telephones and/or PDAs; and
   at least one internal management unit which is connected through respective connecting elements to, and provides for the management of, the coded information reader, the user interface, and the interface for the logical connection with the external control station, said at least one internal management unit being also connected to, and providing for the activation of said interface for the wireless connection with a single pre-identified cellular device and/or telephone and/or PDA in order to configure the terminal as a peripheral device of said single pre-identified cellular device and/or telephone and/or PDA, so as to carry out by means of said terminal operations that are generally carried out by means of said single pre-identified cellular device and/or telephone and/or PDA, wherein before said activation the terminal was not capable of carrying out said operations and after said activation the terminal can be used to carry out said operations in place of said single pre-identified cellular device and/or telephone and/or PDA, wherein the internal management unit is configured to activate said coded information reader for self-scanning operations after the wireless connection with single pre-identified cellular device and/or telephone and/or PDA is established.

2. The portable terminal according to claim 1, wherein said interface for the wireless connection is a bidirectional interface based on a short-range, exclusive wireless communication protocol.

3. The portable terminal according to claim 1, wherein said user interface comprises at least one element selected from among a speaker, a display, a physical or logical keyboard, and a microphone or a voice input system.

4. The portable terminal according to claim 1, wherein said coded information reader is an optical code reader or a RFID tag reader.

5. The portable terminal according to claim 1, wherein said interface for the logical connection with an external control station is an interface for the bidirectional wireless connection of a WLAN type.

6. A method for operating a terminal as a peripheral device of said single pre-identified cellular device and/or telephone and/or PDA, wherein said terminal is a portable terminal comprising:
   a coded information reader;
   a user interface;
   an interface for the logical connection with an external control station;
   an interface for the wireless connection with cellular devices and/or telephones and/or PDAs; and
   at least one internal management unit which is connected through respective connecting elements to, and provides for the management of, the coded information reader, the user interface, and the interface for the logical connection with the external control station, said at least one internal management unit being also connected to, and providing for the activation of, said interface for the wireless connection with said single pre-identified cellular device and/or telephone and/or PDA,
   said method comprising the steps of:
   activating said interface for the wireless connection with cellular devices and/or telephones and/or PDAs;
   establishing a wireless connection with the single pre-identified cellular device and/or telephone and/or PDA in order to configure said terminal as a peripheral device of said single pre-identified cellular device and/or telephone and/or PDA, so as to carry out by means of said terminal operations that are generally carried out by means of said cellular device and/or telephone and/or PDA, wherein before establishing said wireless connection the terminal was not capable of carrying out said operations and after said activation the terminal can be used to carry out said operations in place of said single pre-identified cellular device and/or telephone and/or PDA; and
   activating said coded information reader for self-scanning operations after establishing the wireless connection with single pre-identified cellular device and/or telephone and/or PDA.

7. The method according to claim 6, wherein said interface for the wireless connection with cellular devices and/or telephones and/or PDAs is an interface for the bidirectional wireless connection based on a short-range, exclusive wireless communication protocol.

8. The method according to claim 6, further comprising the step of activating said user interface for receiving and/or sending, through the terminal, at least one phone call, voice message, audio signal, data file, digital image or message of text/image format.

9. The method according to claim 7, wherein said communication protocol is the BLUETOOTH® communication profile, the method further comprising the step of configuring said communication protocol according to a plurality of functional profiles, which can be selected independently from each other, or in combination, the plurality of functional profiles comprising at least one functional profile of a headset type and at least one functional profile of a hands free type.

10. The method according to claim 7, further comprising the step of activating said user interface, in order to show and/or transfer to the user the contents of or information on data/image files stored in said cellular device and/or telephone and/or PDA.

11. The method according to claim 10, further comprising the step of activating said user interface in order to modify said data/image files.

12. The method according to claim 7, further comprising the step of activating said interface for the logical connection with an external control station, in order to transfer data/images acquired by the terminal to the station.

13. The method according to claim 7, further comprising the step of activating said wireless connection for transferring data/images acquired by the terminal to said single pre-identified cellular device and/or telephone and/or PDA.

14. The method according to claim 7, further comprising the steps of:
   activating said user interface in order to carry out a recognition/identification procedure of said cellular device and/or telephone and/or PDA, and
   activating said coded information reader only when said recognition/identification procedure is successfully completed.

15. The method according to claim 7, further comprising the step of activating said coded information reader and/or said user interface by means of a command sent by said single pre-identified cellular device and/or telephone and/or PDA.

16. The method according to claim 7, further comprising the steps of activating said user interface and said interface for the logical connection with an external control station in order to make payments by means of the terminal.

17. The method according to claim 9, further comprising the step of deactivating said interface for the wireless connection with cellular devices and/or telephones and/or PDAs and/or said interface for the logical connection with an external control station after reading of coded information has been completed.

* * * * *